Nov. 1, 1927.

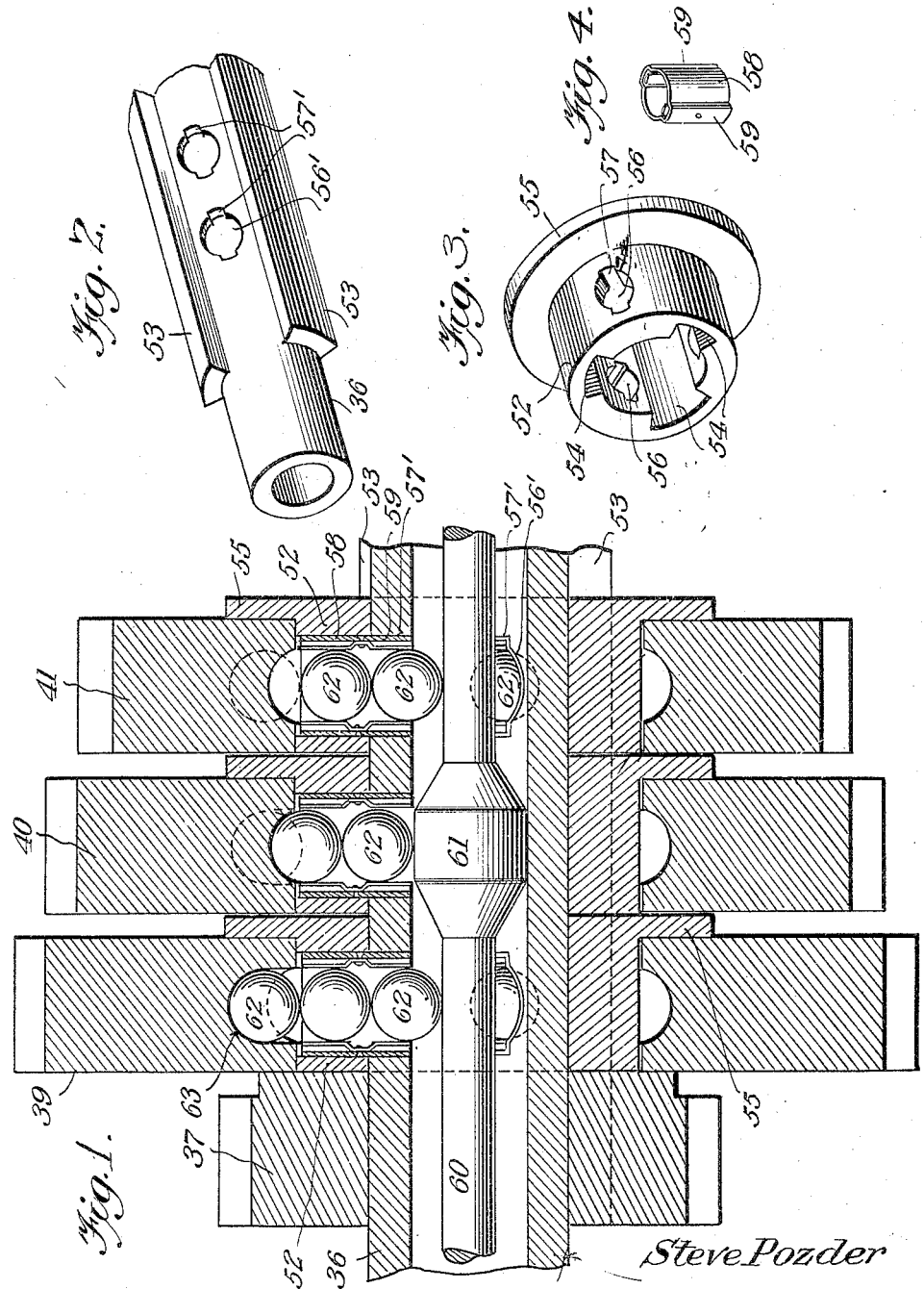

S. POZDER

TRANSMISSION GEARING CLUTCHING MEANS

Filed Nov. 30. 1925

1,647,932

Steve Pozder
INVENTOR

BY Victor J. Evans
ATTORNEY

Patented Nov. 1, 1927.

1,647,932

UNITED STATES PATENT OFFICE.

STEVE POZDER, OF GREAT FALLS, MONTANA.

TRANSMISSION-GEARING-CLUTCHING MEANS.

Application filed November 30, 1925. Serial No. 72,323.

This invention relates to power transmission mechanism, particularly to means whereby a number of speed changes is possible, both in forward and in reverse.

The object of the invention is to provide an apparatus of this character in which novel clutch means is provided for operatively connecting the gears to the rotating shaft upon which they are rotatably mounted.

Another object is to provide means for clutching the relatively rotatable gears to their shaft without any material shock or jar so as to avoid undue strain on any of the parts.

An additional object is the provision of a transmission of this character which will be comparatively simple, easy to operate, positive in action, efficient and durable in service, and a general improvement in the art.

Figure 6:
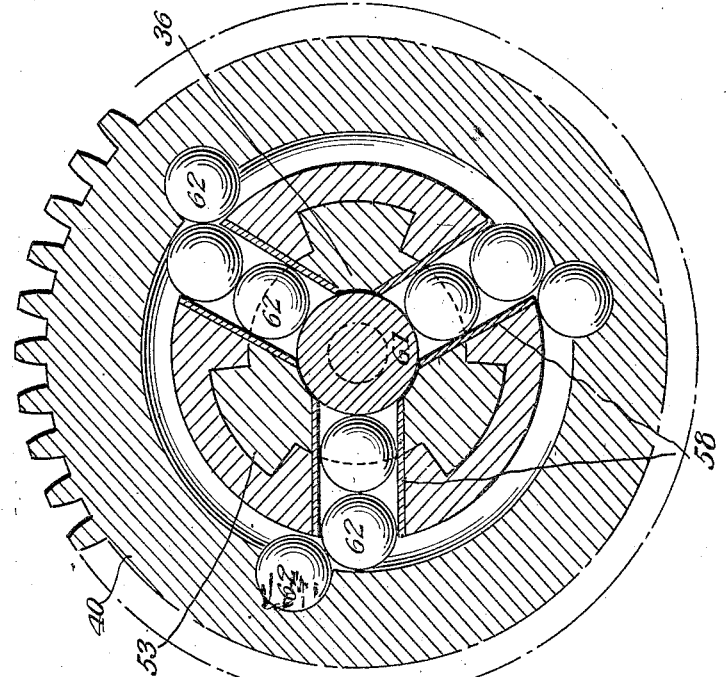
Figure 5:
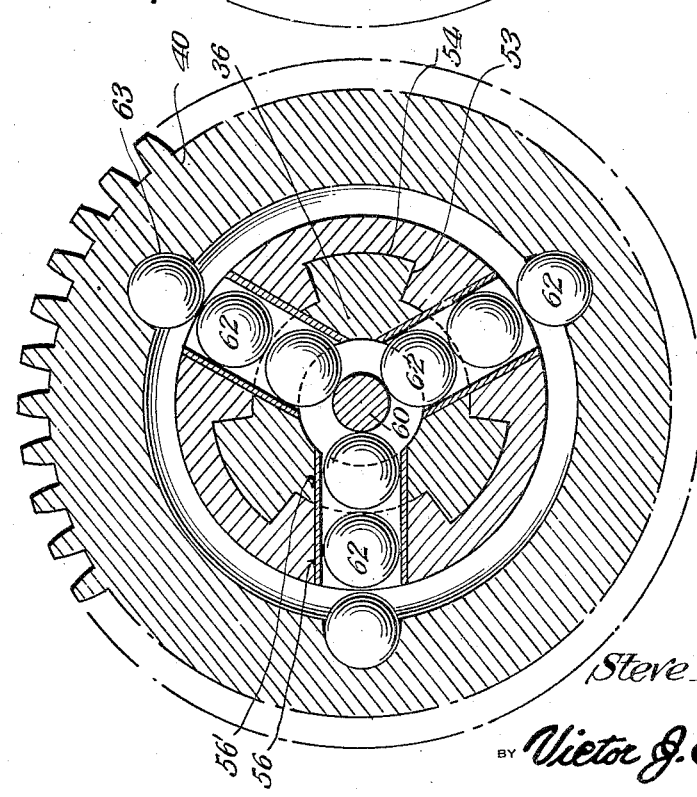

With the above and other objects and advantages in view, the invention consists in the details of construction and arrangement of parts to be hereinafter more fully described and claimed, and illustrated in the accompanying drawings in which:

Figure 1 is an enlarged detail cross section through a few of the gears showing the clutching means, Figure 2 is a detail perspective view of the hollow shaft on which the gears are mounted, Figure 3 is a detail perspective view of one of the collars of the clutching mechanism, Figure 4 is a detail perspective view of one of the ball receiving sleeves of the clutching mechanism, Figure 5 is a cross sectional view through any one of the gears showing the clutching mechanism released, Figure 6 is a similar view showing the clutching means in action for locking the gear for rotation with the shaft.

In carrying out the invention, I provide a hollow shaft 36 upon which is secured a gear 37 adapted to mesh constantly with a gear on a drive shaft. Rotatably mounted with respect to the hollow shaft 36 are gears 39, 40, 41, adapted to mesh with other gears, not shown, for the purpose of providing variable speed drives. Each of the gears 39 to 41 inclusive is rotatably mounted about a collar 52 keyed onto the shaft 36, the numeral 53 designating the keys on the shaft and the numeral 54 designating the keyways in the collars. Each collar is shown as having an outstanding flange 55 which is engaged between successive gears for the purpose of holding them in spaced relation. Each collar is furthermore provided with a plurality of circular openings 56 at the sides of which are recesses 57. Fitting within these openings 56 are sleeves or guides 58 of cylindrical form provided at opposite sides with ribs 59 fitting within the recesses 57. In the present instance there are three of such sleeves shown for each collar and gear.

Extending axially through the hollow shaft 36 is a longitudinally movable rod 60 formed intermediate its ends with an enlargement 61 having a fairly close fit within the shaft, the rod itself being of considerably less diameter than the interior of the hollow shaft. Located within the sleeves 58 are balls 62, the innermost ones of which normally bear against the rod 60 and the outermost ones of which fit within pockets 63 in the inner peripheries of the ring gears 39 to 41 inclusive. In the present instance there are three balls in each sleeve and the parts are so related that the outermost point of the intermediate ball lies at the periphery of the collar as clearly indicated in Figure 5. The outermost balls, therefore, ride upon the periphery of the collar so that the collar may rotate freely with respect to the gear carried thereby. To lock a selected gear for rotation with the shaft 36 it is necessary to move the rod 60 longitudinally so that the enlargement 61 thereon will be brought into engagement with the innermost balls of the gear selected for forcing the innermost and intermediate balls outwardly, the latter then engaging against the inner periphery of the ring gear so that their path will obstruct the path of the outermost balls which rotate with the gear. Obviously the gear must then rotate with its collar as clearly indicated in Figure 6.

Any suitable means may be provided for moving the rod 60 longitudinally.

In the operation, it will be seen that whenever the engine is in operation the gear 37 will cause rotation of the shaft 36 and all the collars 52 carried thereby. If the rod 60 is shifted to bring the enlargement 61 into such position as to clutch any one of the gears 39 to 41 onto the shaft 36 whatever shaft is geared thereto will be driven. As the mechanism embodies the peculiar projectable ball members which constitute the driving connection between the collars and the ring gears rotatable thereabout, it is evident that there will be practically no shock or jar when the clutching action is accomplished and in this way there will be absence of undue strain on the parts and no likelihood of stripping the gears.

While I have shown and described a preferred embodiment of the invention, it should be understood that I reserve the right to make such changes in the form, construction and arrangement of parts as will not depart from the spirit of the invention or the scope of the subjoined claims.

Having thus described the invention, I claim:

1. In a transmission gearing, a hollow shaft, a collar on the hollow shaft, a ring gear rotatably mounted upon the collar, the hollow shaft and collar being formed with radial openings and the inner periphery of the ring gear being formed with pockets, a plurality of balls arranged within said openings, a rod slidable through the hollow shaft and against which the innermost ones of the balls normally engage, the outermost balls engaging within said pockets and bearing upon the adjacent collar, an enlargement on the rod adapted to be engaged with the innermost balls for moving the intermediate ones outwardly into engagement with the inner periphery of the ring gear.

2. In a transmission gearing, a hollow rotatable shaft, a rod slidable longitudinally through the shaft and having an enlarged portion thereon, a collar member secured upon the shaft, the collar member and shaft being formed with radial openings, a sleeve within the registering openings in the shaft and collar, a ring gear rotatably mounted about the collar and having its inner periphery formed with pockets, a plurality of balls mounted within each sleeve, a plurality of balls engaging within said pockets and the innermost ones of the first named balls normally engaging the rod, the rod being movable whereby the enlargement thereon will engage the first named balls and force them outwardly with the outermost ones engaging against the inner periphery of the ring gear.

In testimony whereof I affix my signature.

STEVE POZDER.